United States Patent [19]

O'Connor

[11] Patent Number: 5,101,928
[45] Date of Patent: Apr. 7, 1992

[54] POWER PACK SUSPENSION SYSTEM

[75] Inventor: William O'Connor, Westport, Conn.

[73] Assignee: Avco Corporation, Providence, R.I.

[21] Appl. No.: 515,556

[22] Filed: Apr. 27, 1990

[51] Int. Cl.⁵ ............................................... B60K 5/10
[52] U.S. Cl. .................................... 180/291; 180/293;
 180/297; 180/300; 180/312; 248/638; 267/160;
 267/230
[58] Field of Search ............... 180/291, 292, 293, 297,
 180/300, 312; 248/638; 267/136, 140.3, 140.5,
 141, 153, 160, 230

[56] References Cited

U.S. PATENT DOCUMENTS

| | | | |
|---|---|---|---|
| 1,699,332 | 1/1929 | Link | 180/300 |
| 4,171,027 | 10/1979 | Seit et al. | 267/153 |
| 4,641,810 | 2/1987 | Ott | 248/638 |
| 4,687,071 | 8/1987 | Hartz et al. | 180/297 |
| 4,796,721 | 1/1989 | Knapp et al. | 180/312 |
| 4,946,146 | 8/1990 | Hoepf | 267/153 |

FOREIGN PATENT DOCUMENTS 787781 12/1957 United Kingdom ................ 180/293

Primary Examiner—David M. Mitchell
Assistant Examiner—Eric Culbreth
Attorney, Agent, or Firm—Perman & Green

[57] ABSTRACT

A suspension system for mounting a power pack including engine, transmission, and associated equipment to the frame of a land vehicle, such as a tank. The suspension system includes static supports for substantially immovably mounting the power pack to the frame at spaced locations and at least one dynamic support for yieldably mounting the power pack. The dynamic support includes at least one vertically disposed spring member fixed to the power pack together with a linkage connecting a free end of the spring member to the frame of the land vehicle. The suspension system accommodates a range of relative movement between the power pack and the frame of the land vehicle.

13 Claims, 3 Drawing Sheets

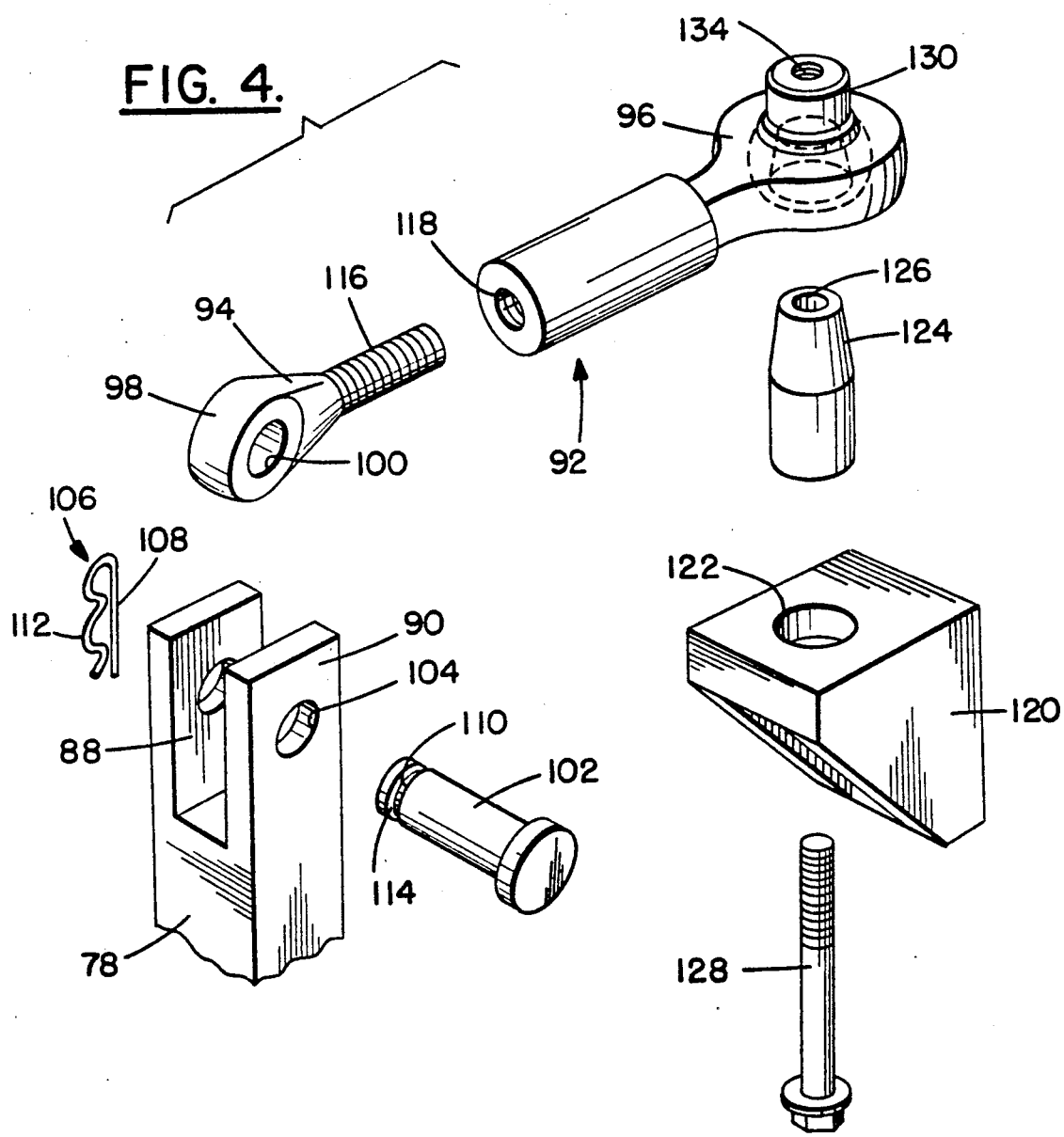

POWER PACK SUSPENSION SYSTEM

BACKGROUND OF THE INVENTION

1. Field of the Invention

The present invention relates generally to land vehicles and, more particularly, to an improved suspension system for yieldably mounting the power pack in an armored vehicle such as a tank.

2. Description of the Prior Art

The modern armored vehicle is driven by a power pack which comprises an engine, transmission, and ancillary support subsystems such as oil coolers, inlet filters, exhaust stacks, and the like. The suspension system for positioning and supporting the power pack in the vehicle must have the capability of satisfying a number of important requirements. In a first instance, it must be structurally compatible with the major components of which the power pack is comprised. It must be compact, not occupying space required for other systems. It should be easily accessible, for maintenance, including replacement of vital components. It must be flexible to accommodate distortions of the frame or hull of the vehicle during operation. Additionally, it must be survivable, that is, redundancy must be provided to compensate for battle damage.

It has been customary to support the power pack on the frame of the vehicle at three locations with each of these three supports being of a substantially non-yielding construction. Such a known system allows six degrees of structural freedom and eliminates the possibility of introducing loads generated by deflections of the vehicle hull into the power pack components.

The drawback of this arrangement, however, is that if one of the mounting supports fails, the power pack ceases to function effectively. To avoid this condition, it is possible to incorporate an additional support into the system. This would guarantee the continued effective operation of the power pack in the event of failure at a single location.

The drawback indigenous to the known system is that it is redundant structurally and permits hull loads to be reacted into the power pack components with the likelihood of overstressing them. Therefore, the most effective mounting system from a structural standpoint would be one that provides power pack support redundancy without allowing the introduction of hull generated external loads into the power pack components. The suspension system of the invention achieves this goal.

SUMMARY OF THE INVENTION

To this end, a suspension system for mounting a power pack including engine, transmission, and associated equipment to the frame of a land vehicle, for example, a tank, has been devised. The suspension system includes static supports for substantially immovably mounting the power pack to the frame at spaced locations and at least one dynamic support for yieldably mounting the power pack. The dynamic support includes at least one vertically disposed spring member fixed to the power pack together with the linkage connecting a free end of the spring member to the frame of the land vehicle. The suspension system accommodates a range of relative movement between the power pack and the frame of the land vehicle.

Preferably a pair of the spring members are provided. Each of the spring members performs to counteract the torque loads generated by the transmission, to counteract the inertia loads generated at the power pack as a result of vehicle accelerations, and to counteract any torque loads generated by differential deflections of the hull or frame of the vehicle.

There are a number of features and benefits of the invention which are particularly noteworthy. In a first instance, the dynamic support members occupy only a small space which is not required for other systems. They provide the most direct load paths between the power pack and the hull of the vehicle because they are located generally in the plane of those locations on the transmission at which the engine is supported. Additionally, the dynamic supports provide as short as possible a load path between the transmission unit and the hull for counteracting the torque loads generated by the transmission. Still another feature of the invention resides in the fact that the dynamic supports protect the power pack from loads induced by deflection of the hull structure with movement of the vehicle. A particularly important feature of the invention resides in a preferred construction in which a pair of dynamic supports are used to provide a fail safe configuration. That is, each support is designed to have the capability of supporting the power pack and permitting its continued function in the event of failure of the other dynamic support. Such a construction ensures an exceptional measure of redundancy which is necessary for a combat vehicle.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention, and, together with the description, serve to explain the principles of the invention in general terms. Like numerals refer to like parts throughout the disclosure.

BRIEF DESCRIPTION OF THE DRAWINGS

FIG. 4 is an exploded perspective view illustrating the mounting system of FIG. 3.

DETAILED DESCRIPTION OF THE PREFERRED EMBODIMENT

Figure 1:
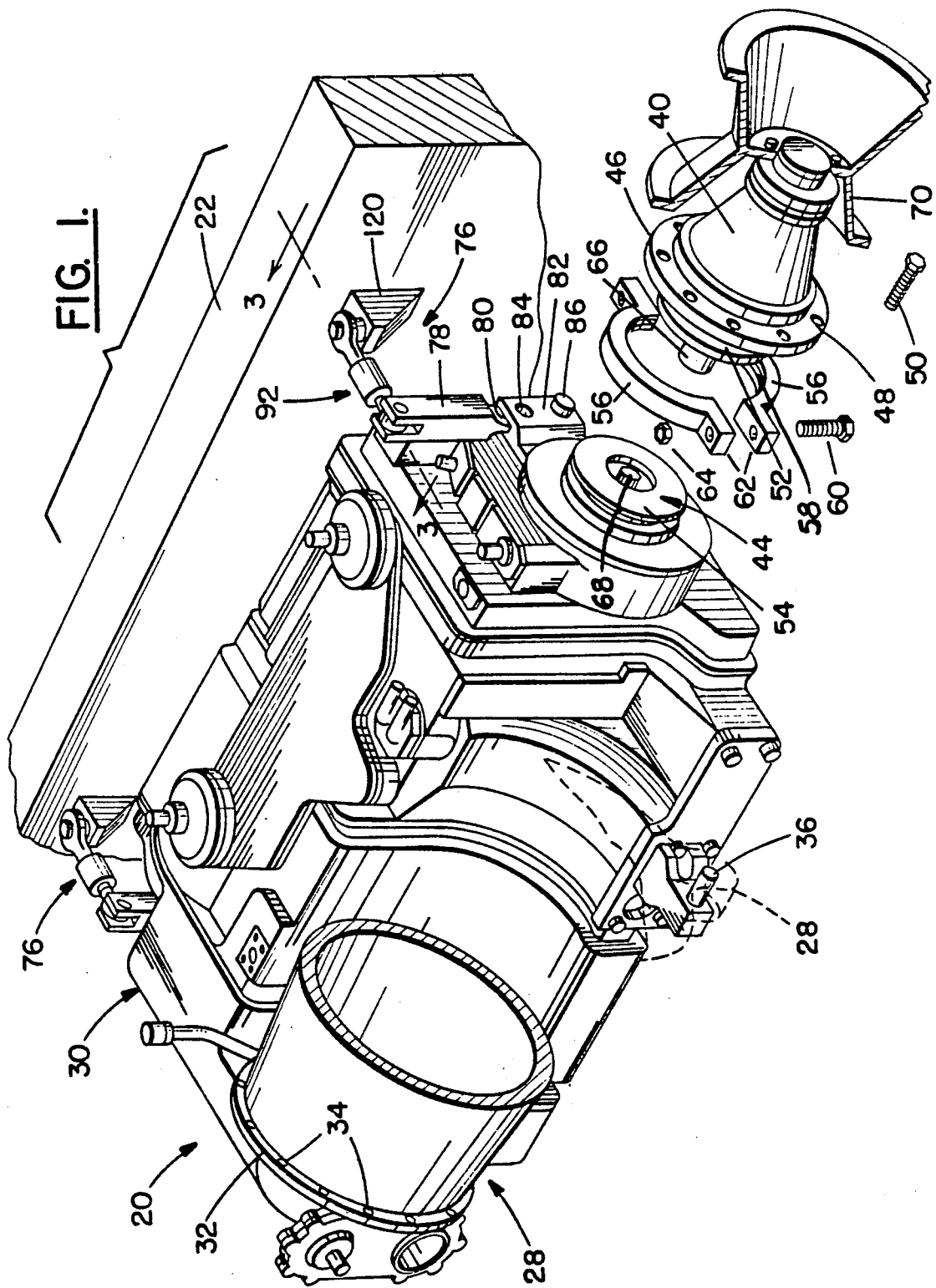
FIG. 1 is a partially exploded view, in perspective, illustrating the suspension system of the invention for yieldably mounting a power pack to the frame of a land vehicle.
Figure 2:
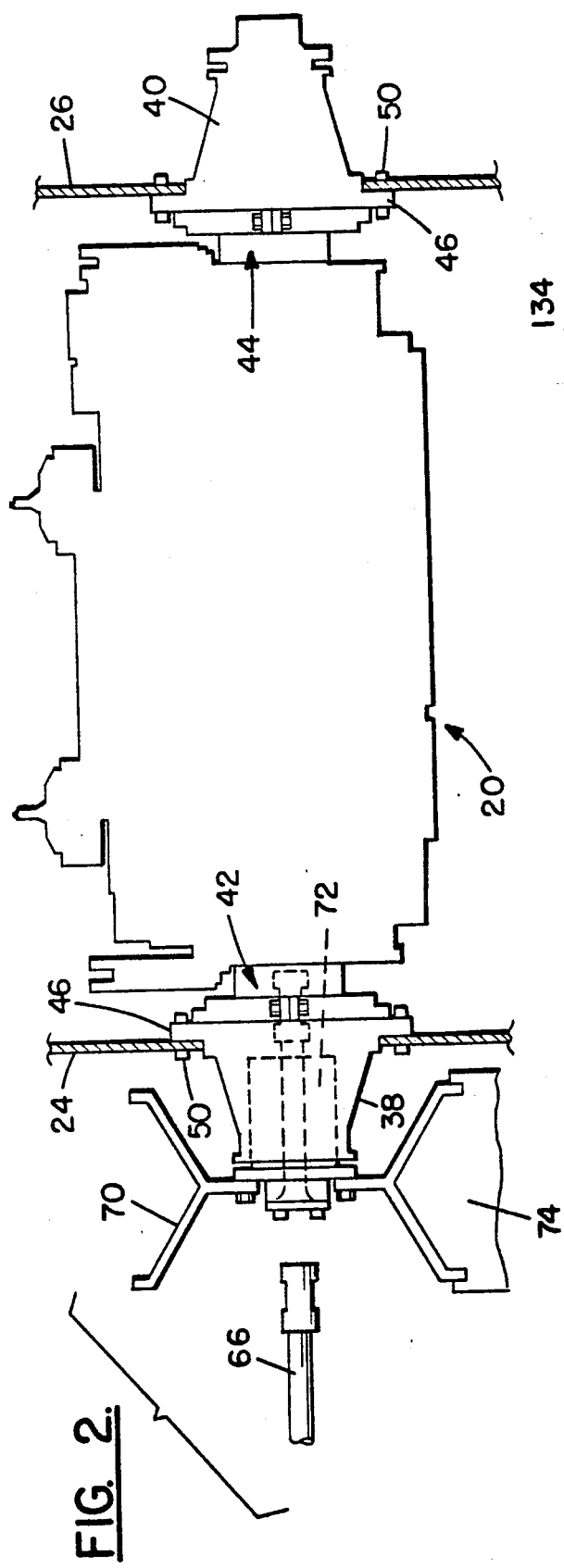
FIG. 2 is a front elevation diagrammatic view illustrating the power pack assembly of FIG. 1.

Turn now to the drawings and, initially, to FIG. 1 which illustrates a power pack 20 which is supported on a hull or frame 22 of a land vehicle. The land vehicle is typically of an armored type such as a tank and, as seen in FIG. 2, the power pack may be laterally disposed, supported on spaced apart and opposed structural side members 24, 26 of the hull or frame of the vehicle.

As seen in FIG. 1, the power pack 20 includes an engine 28, which may be a gas turbine, a transmission 30 drivingly coupled to the engine 28, and ancillary systems such as air coolers, air filters, exhaust stacks, and the like. In a customary fashion, the structure of the engine 28 is mounted to the transmission 30 at a pair of locations. One of the locations is at a circular flange 32 which is apertured to receive a plurality of circumferentially spaced fasteners 34. The other location for mounting the engine 28 to the transmission 30 is at a laterally disposed forward mounting pin 36. Hence, for purposes of mounting on the hull or frame 22 of the vehicle, the engine 28, transmission 30, and ancillary equipment all operate as a unit.

It was earlier mentioned that the power pack 20 extends between and is supported by the structural side members 24, 26. As seen in FIGS. 1 and 2, a pair of cone shaped collars 38, 40 are positioned at and mounted to associated transmission output members 42, 44 at either side of the vehicle. At its inboard end, each of the collars 38, 40 has an integral circular flange 46 provided with a plurality of circumferentially positioned holes 48 for the reception of suitable fasteners 50 for fixed attachment of its associated collar to the structural side members 24, 26.

Still farther inboard of the circular flange 46 on the collar 40, as seen in FIG. 1, is another circular flange 52 which is butted up against a similar sized circular flange 54 of the transmission output member 44. A pair of semicircular mounting trunnions 56 are internally grooved as at 58 for reception over the outer peripheral regions of the circular flanges 52, 54 when they are butted in a contiguous relationship. The mounting trunnions 56 are clamped together by means of bolts 60 which extend through suitably pierced ears 62 of the mounting trunnions and are threadedly engaged with nuts 64. The collar 40 is thereby fixedly attached to the transmission 30 and a similar construction is provided for mounting the collar 38, via the transmission output member 42 to the transmission.

At an inboard end, an output shaft 66, rotatably supported on each of the collars 38, 40 is internally splined for connection with an externally splined drive shaft 68 which is the output of the transmission 30. In its turn, the output shaft 66 drives a sprocket 70 via an epicyclic gear train 72 supported by an associated collar 38, 40. A track 74 for the vehicle is suitably engaged and driven by the sprocket 70.

Figure 3:
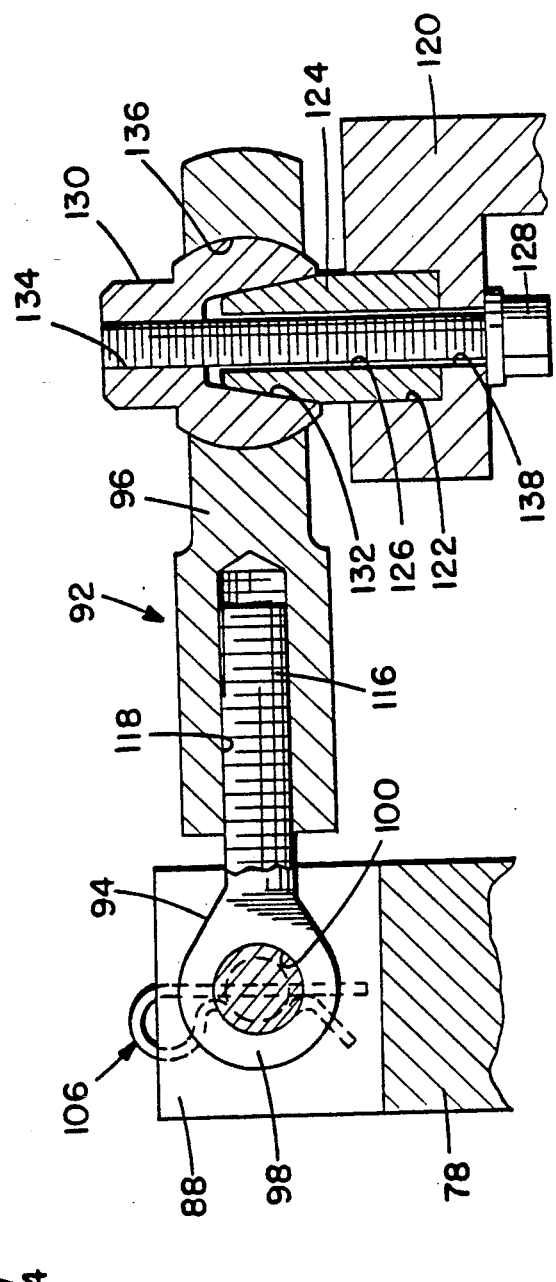
FIG. 3 is a detail cross section view taken generally along line 3—3 in FIG. 1.

With particular attention now to FIGS. 1, 3, and 4, a pair of dynamic support mechanisms 76 are provided at laterally spaced locations for yieldably mounting the power pack 20 to the frame 22 of the vehicle. The support mechanism 76 includes an elongated spring member 78 whose longitudinal axis is generally vertically disposed. A lower, or first, end is of reduced thickness and is received in a slot 80 suitably provided in an outer housing 82 of the transmission 30. The spring member is fixed to the outer housing 82 by means of mounting bolts 84, 86.

An upper, or second, end of the spring member 78 is bifurcated to define a pair of spaced apart ear members 88, 90. The support mechanism 76 also includes an elongated link 92 including a fore member 94 and an aft member 96. A head 98 of the fore member 94 is provided with a lateral bore 100 for slidable reception of a mounting pin 102 which is similarly received through a pair of aligned apertures 104 in the ear members 88, 90. When the mounting pin 102 has been fully inserted through the apertures 104 so as to pivotally mount the fore member 94 to the free end of the spring member 78, a resilient retainer pin 106 is applied to an end of the retainer pin to hold it in place.

Specifically, the retainer pin 106 includes a straight element 108 which is slidably received in a diametral bore 110 in an end of the mounting pin 102 and an opposed curved element 112 is shaped to conform with an annular groove 114 adjacent the end of the mounting pin and coplanar with the bore 110. When the retainer pin 106 is fully seated as illustrated in FIG. 3, it effectively prevents removal of the pin 102 from the spring 78.

An end of the fore member 94 opposite the head 98 is threaded as at 116 and is intended for threaded engagement with a tapped bore 118 formed in a forward facing end of the aft member 96.

For its turn, the aft member 96 is pivotally mounted to the frame 22. This construction is best illustrated in FIGS. 3 and 4 which illustrate a bracket 120 which is fixed, as by welding, to the frame 22 of the land vehicle. A vertically oriented blind hole 122 is formed into an upper surface of the bracket 120 and serves to fittingly receive a tapered insert 124 provided with a longitudinal bore 126 for freely receiving therethrough a bolt 128. A spherical bearing member 130 is formed with a tapered counter bore 132 which is coaxial with a tapped bore 134 for threaded reception of the bolt 128. The end of the aft member 96 distant from the tapped bore 118 is enlarged and formed with a spherical interior surface 136 constructed to suitably receive the outer surface of the spherical bearing member 130 for contiguous sliding engagement therewith.

The construction of the dynamic support mechanism 76 as just described embodies a number of features. For example, when the power pack 20 is initially installed into the frame 22 of the land vehicle, alignment and final mounting of the power pack is significantly aided by reason of the construction which includes the tapered insert 124 and the tapered counterbore 132. Specifically, as the power pack 20 is lowered into the vehicle, it is positioned to enable the tapered counterbore 132 of the spherical bearing member 130 to generally engage the tapered insert 124. Initially, as the power pack is lowered into the vehicle during assembly, alignment of the power pack relative to the vehicle may not be precise, but with further lowering of the power pack, it does attain a precise positioning by reason of further engagement of the tapered counterbore 132 with its associated tapered insert 124. Thereupon, the bolt 128 is inserted through a clearance hole 138 in the bracket 120, then through the longitudinal bore 126 in the tapered insert 124, and then threadedly engaged with the tapped bore 134 of the spherical bearing member 130. When the bolt 128 is fully tightened, the spherical bearing member 130 firmly engages the insert 124, thereby firmly mounting the aft member 96 to the frame of the vehicle, while yet permitting its universal movement relative to the bracket.

Prior to assembly of the aft member 96 with the bracket 120, the fore member 94, while free of the spring member 78, may be adjusted to obtain a desired length of the elongated link 92. That is, the fore member 94 may be rotated about its threaded end 116 to achieve a desired length of the link 92 so that the distance between the spring 78 and the frame 22 will be of a preferred magnitude.

Once the power pack 20 is mounted in place on the frame 22 of the land vehicle, it will be appreciated that the dynamic support mechanism 76 is available to yieldably counteract a variety of loading which exists between the frame 22 and the power pack 20. These loads include the torque loads generated by the transmission 30, the inertial loads generated at the power pack as a function of vehicle accelerations, and torque loads generated by differential deflections of the frame or hull 22 as the vehicle moves across the unlevel terrain. The invention is thus effective to satisfy those requirements for positioning and supporting a power pack in an armored vehicle which were mentioned at the onset of the present disclosure.

While preferred embodiments of the invention have been disclosed in detail, it should be understood by those skilled in the art that various other modifications may be made to the illustrated embodiments without departing from the scope of the invention as described in the specification and defined in the appended claims.

I claim:

1. A suspension system for mounting to the frame of a land vehicle a power pack for propelling the land vehicle comprising:
   static support means for substantially immovably mounting the power pack on the frame of the vehicle at a pair of spaced locations defining a mounting axis for the power pack; and
   resilient linkage means for yieldably mounting the power pack to the frame of the vehicle at at least a third location so as to permit relative movement therebetween along said mounting axis, transverse of said mounting axis, and about said mounting axis, said resilient linkage means including:
   at least one elongated spring member extending between first and second ends and fixed at said first end to the power pack; and
   an elongated link having fore and aft ends;
   first joint means pivotally connecting said link at said fore end to said second end of said spring member; and
   second joint means pivotally connecting said link at said aft end to said frame;
   a bracket integral with the frame of the land vehicle; and
   a horizontal shelf on said bracket;
   wherein said elongated link includes an aft member having a spherical interior surface; and
   wherein said second joint means includes:
   a tapered insert supportively engaged with said horizontal shelf;
   a spherical bearing member having an outer spherical surface contiguously, slidably, engaged with said spherical interior surface of said aft member of said elongated link and having a tapered recess conformably shaped with said tapered insert; and
   means for fixedly joining said tapered insert and said spherical bearing by drawing said tapered insert into firm engagement with the tapered recess of said spherical bearing.

2. A suspension system as set forth in claim 1 wherein said second end of said spring member is bifurcated to define a pair of spaced apart ear members; and
   wherein said link has an aperture at said fore end; and
   wherein said resilient linkage means includes a pin freely extending through the aperture in said link and fixed to said ear members.

3. A suspension system as set forth in claim 1 wherein said second joint means is a ball joint.

4. A suspension system as set forth in claim 1 wherein said spring member has a longitudinal axis which is substantially vertically disposed, said second end being yieldable in lateral and longitudinal directions through said link to accommodate relative movement between the power pack and said frame during operation of the land vehicle.

5. A suspension system as set forth in claim 1 including adjustable means for selectively adjusting the length of said elongated link.

6. A land vehicle comprising:
   a frame;
   power pack means including a pair of spaced apart drive members for propelling said land vehicle;
   static support means for substantially immovably mounting said power pack means on said frame at a pair of spaced locations defining a mounting axis for said power pack; and
   resilient linkage means for yieldably mounting said power pack means on said frame at at least a third spaced location so as to permit relative movement between said power pack means and said frame along said mounting axis, transverse of said mounting axis, and about said mounting axis, said resilient linkage means including:
   at least one elongated spring member extending between first and second ends and fixed at said first end to said power pack means; and
   an elongated link having fore and aft ends;
   first joint means pivotally connecting said link at said fore end to said second end of said spring member; and
   second joint means pivotally connecting said link at said aft end to said frame;
   wherein said frame includes:
   a bracket; and
   a horizontal shelf on said bracket;
   wherein said elongated link includes an aft member having a spherical interior surface; and
   wherein said second joint means includes:
   a tapered insert supportively engaged with said horizontal shelf;
   a spherical bearing member having an outer spherical surface contiguously, slidably, engaged with said spherical interior surface of said aft member of said elongated link and having a tapered recess conformably shaped with said tapered insert; and
   means for fixedly joining said tapered insert and said spherical bearing by drawing said tapered insert into firm engagement with the tapered recess of said spherical bearing.

7. A land vehicle as set forth in claim 6 wherein said power pack means includes a prime mover and a transmission drivingly connected to said prime mover and to said drive members.

8. A land vehicle as set forth in claim 6 wherein said second end of said spring member is bifurcated to define a pair of spaced apart ear members; and
   wherein said link has an aperture at said fore end; and
   wherein said resilient linkage means includes a pin freely extending through the aperture in said link and fixed to said ear members.

9. A land vehicle as set forth in claim 6 wherein said second joint means is a ball joint.

10. A land vehicle as set forth in claim 6 wherein said spring member has a longitudinal axis which is substantially vertically disposed, said second end being yieldable in lateral and longitudinal directions through said link to accommodate relative movement between said power pack and said frame during operation of said land vehicle.

11. A land vehicle as set forth in claim 6 including: adjustable means for selectively adjusting the length of said elongated link.

12. A suspension system for mounting to the frame of a land vehicle a power pack for propelling the land vehicle comprising:

static support means for substantially immovably mounting the power pack on the frame of the vehicle at a pair of spaced locations defining a mounting axis for the power pack; and resilient linkage means for yieldably mounting the power pack to the frame of the vehicle at at least a third location so as to permit relative movement therebetween along said mounting axis, transverse of said mounting axis, and about said mounting axis, said resilient linkage means including:

at least one elongated spring member extending between first and second ends and fixed at said first end to the power pack; and an elongated link having fore and aft ends;

first joining means pivotally connecting said link at said fore end to said second end of said spring member; and second joint means pivotally connecting said link at said aft end to said frame;

a bracket integral with the frame of the land vehicle including a horizontal shelf having a vertical clearance hole therethrough and an upwardly facing counterbore coaxial with the clearance hole; and wherein said elongated link includes an aft member having a spherical interior surface;

wherein said second joint means includes:

a tapered insert receivable on the counterbore of said horizontal shelf and having a longitudinal bore therethrough generally aligned with the clearance hole and with the counterbore;

a spherical bearing member having an outer spherical surface contiguously, slidably engaged with said spherical interior surface of said aft member of said elongated link, said spherical bearing member having a tapped bore and a tapered counterbore coaxial therewith and conformably shaped with said tapered insert; and a bolt extending through the clearance hole in said bracket, through the longitudinal bore in said tapered insert, through the counterbore in said spherical bearing and threadedly engaged with the tapped bore in said spherical bearing subject to being tightened to thereby draw said tapered insert and said spherical bearing into firm engagement.

13. A land vehicle comprising:

a frame;

power pack means including a pair of spaced apart drive members for propelling said land vehicle;

static support means for substantially immovably mounting said power pack means on said frame at a pair of spaced locations defining a mounting axis for said power pack; and resilient linkage means for yieldably mounting said power pack means on said frame at at least a third spaced location so as to permit relative movement between said power pack means and said frame along said mounting axis, transverse of said mounting axis, and about said mounting axis, said resilient linkage means including:

at least one elongated spring member extending between first and second ends and fixed at said first end to said power pack means; and an elongated link having fore and aft ends;

first joint means pivotally connecting said link at said fore end to said second end of said spring member; and second joint means pivotally connecting said link at said aft end to said frame;

wherein said frame includes:

a bracket including a horizontal shelf having a vertical clearance hole therethrough and an upwardly facing counterbore coaxial with the clearance hole; and wherein said elongated link includes an aft member having a spherical interior surface;

wherein said second joint means includes:

a tapered insert receivable in the counterbore of said horizontal shelf and having a longitudinal bore therethrough generally aligned with the clearance hole and with the counterbore;

a spherical bearing member having an outer spherical surface contiguously, slidably, engaged with said spherical interior surface of said aft member of said elongated link, said spherical bearing member having a tapped bore and a tapered counterbore coaxial therewith and conformably shaped with said tapered insert; and a bolt extending through the clearance hole in said bracket, through the longitudinal bore in said tapered insert, through the counterbore in said spherical bearing and threadedly engaged with the tapped bore in said spherical bearing subject to being tightened to thereby draw said tapered insert and said spherical bearing into firm engagement.

* * * * *